(12) United States Patent
Jibry (10) Patent No.: US 8,149,977 B2
(45) Date of Patent: Apr. 3, 2012

(54) RECOVERING DATA SAMPLES

(75) Inventor: Rafel Jibry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 595 days.

(21) Appl. No.: 12/361,012

(22) Filed: Jan. 28, 2009

(65) Prior Publication Data

US 2010/0189207 A1    Jul. 29, 2010

(51) Int. Cl.
*H04L 25/00* (2006.01)
(52) U.S. Cl. ........ 375/371; 375/354; 375/232; 375/316; 375/258; 714/807
(58) Field of Classification Search .............. 375/371, 375/232, 316, 219, 354, 258; 714/807
See application file for complete search history.

(56) References Cited

U.S. PATENT DOCUMENTS

| | | | |
|---|---|---|---|
| 6,078,614 A | 6/2000 | Brown et al. | |
| 6,678,110 B2 * | 1/2004 | Ellis | 360/77.08 |
| 6,819,514 B1 | 11/2004 | Behrens et al. | |
| 7,065,133 B1 * | 6/2006 | Phanse et al. | 375/219 |
| 7,222,289 B2 * | 5/2007 | Hung | 714/807 |
| 7,738,567 B2 * | 6/2010 | Miller et al. | 375/258 |
| 2005/0220220 A1 * | 10/2005 | Belotserkovsky | 375/316 |
| 2006/0023780 A1 * | 2/2006 | Jibry | 375/232 |

FOREIGN PATENT DOCUMENTS

EP    0831478 A1    3/1998

* cited by examiner

*Primary Examiner* — Eva Puente (57) ABSTRACT

An apparatus recovers synchronous data samples from an asynchronously over-sampled stream of data samples derived from an input signal the spectral characteristic of which is subject to variation. The apparatus comprises an FIR filter having an input for receiving the asynchronously over-sampled stream of data samples and for producing equalised asynchronous samples. A signal sample reconstruction means reconstructs the synchronous data samples from the equalised asynchronous data samples. An automatic gain control loop is responsive to the reconstructed data samples to apply gain control for producing gain controlled reconstructed samples. A timing recovery means is responsive to the gain controlled reconstructed samples to provide timing information to the signal sample reconstruction means. A coefficient adaptation control loop is responsive to equalised reconstructed asynchronous data samples substantially unaffected by the automatic gain control for adapting the FIR filter coefficients to the variations in the spectral characteristics of the input signal.

15 Claims, 10 Drawing Sheets

Comparative Example

RECOVERING DATA SAMPLES

FIELD

The present invention relates to a method of, and apparatus for, recovering data samples

BACKGROUND

It is known to recover synchronous data samples from an asynchronously oversampled analogue signal produced by a signal source for example a tape or disc drive, or a communications channel. It is known to use an FIR filter to compensate for variations in the spectral characteristics of the signal from the signal source. Prior proposals for doing that have either used complicated algorithms for the control systems controlling the recovery or used simpler algorithms which have other disadvantages. It is desirable to simplify the control system to allow the use of simpler algorithms whilst enhancing recovery of the data samples.

SUMMARY

In accordance with one aspect of the present invention, there is provided an apparatus for recovering synchronous data samples from an asynchronously over-sampled stream of data samples derived from an input signal, the spectral characteristics of the input signal being subject to variation, the apparatus comprising;

an FIR filter having an input for receiving the asynchronously over-sampled stream of data samples and operable to produce equalised asynchronous samples;

a signal sample reconstruction arrangement operable to reconstruct the synchronous data samples from the equalised asynchronous data samples;

an automatic gain control loop responsive to a first slicing level error signal to apply gain control to produce gain controlled reconstructed synchronous samples;

a slicer arrangement responsive to gain controlled reconstructed synchronous samples to produce the first error slicing level signal and responsive to reconstructed synchronous samples substantially unaffected by gain control to produce a second slicing level error signal;

a timing recovery arrangement responsive to the first error signal to provide timing information to the signal sample reconstruction means; and a coefficient adaptation control loop responsive to the second error signal to adapt the FIR filter coefficients to the variation in the spectral characteristics of the input signal.

In accordance with another aspect of the present invention, there is provided a method of recovering synchronous data samples from an asynchronously over-sampled stream of data samples derived from an input signal, the spectral characteristics of the input signal being subject to variation, the method comprising;

applying an FIR filter to the asynchronously over-sampled stream of data samples to produce equalised asynchronous samples;

reconstructing the synchronous data samples from the equalised asynchronous data samples;

applying automatic gain control to the data samples in dependence on a first error signal to produce gain controlled reconstructed synchronous data samples;

slicing the gain controlled reconstructed synchronous data samples to produce the first error signal;

recovering timing information using the first error signal for use in reconstructing the synchronous data samples;

slicing reconstructed synchronous samples substantially unaffected by the automatic gain control to produce a second error signal; and adapting the FIR filter coefficients to the variations in the spectral characteristics of the input signal in response to the second error signal.

Embodiments of the invention will now be described by way of example with reference to the accompanying drawings.

BRIEF DESCRIPTION OF THE DRAWINGS

FIGS. 8A, B, C and D are schematic diagrams of signal sources;

In the drawings, like references indicate like features of the embodiments of the invention shown in the drawings. Elements of one of the Figures that correspond to elements of another of the Figures are designated by the same reference numerals.

DETAILED DESCRIPTION OF ILLUSTRATIVE EMBODIMENTS

Signal Sampling

Figure 1A:
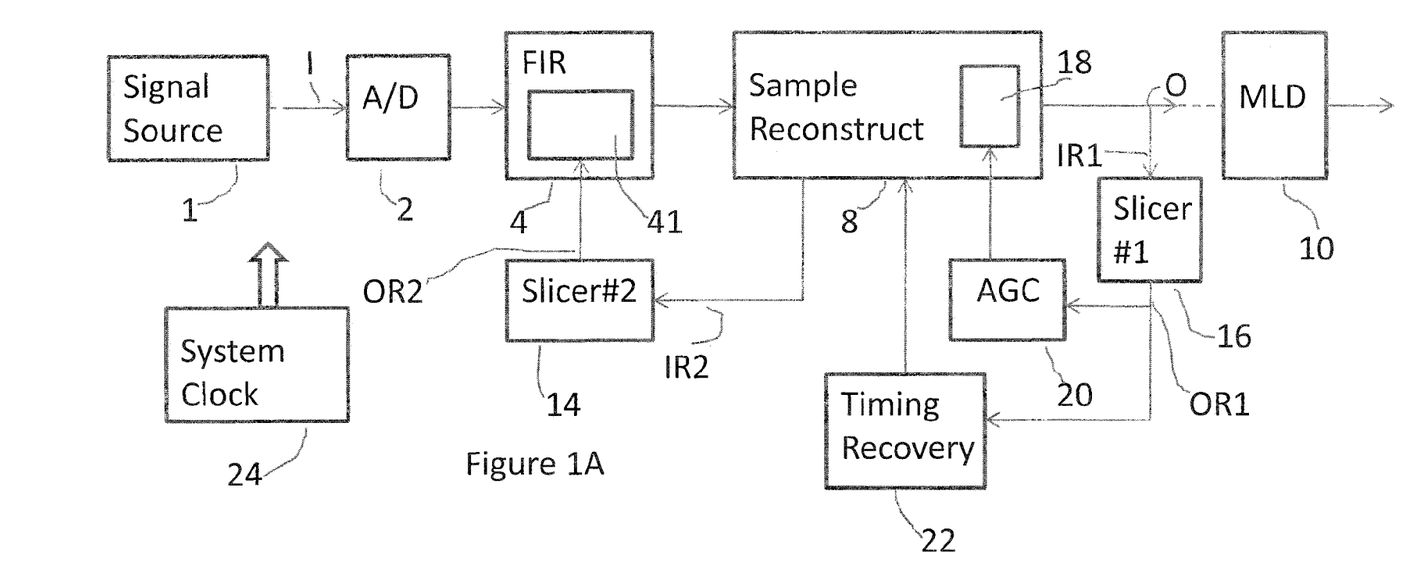
FIG. 1A is a schematic diagram providing an illustrative overview of signal processing for recovering data samples in accordance with the invention.

Referring to FIG. 1A, a signal source 1 provides an analogue signal carrying data which occurs at a predetermined data rate. An analogue to digital (A/D) converter 2 samples the analogue signal at a sampling rate greater than the data rate of the data in the analogue signal and asynchronous with the data carried by the analogue signal: i.e. the analogue signal is "asynchronously oversampled". In this example the analogue to digital converter samples the analogue signal at 3/2 times the data rate; that is there are three samples of the analogue signal for every two data samples.

Figure 2:
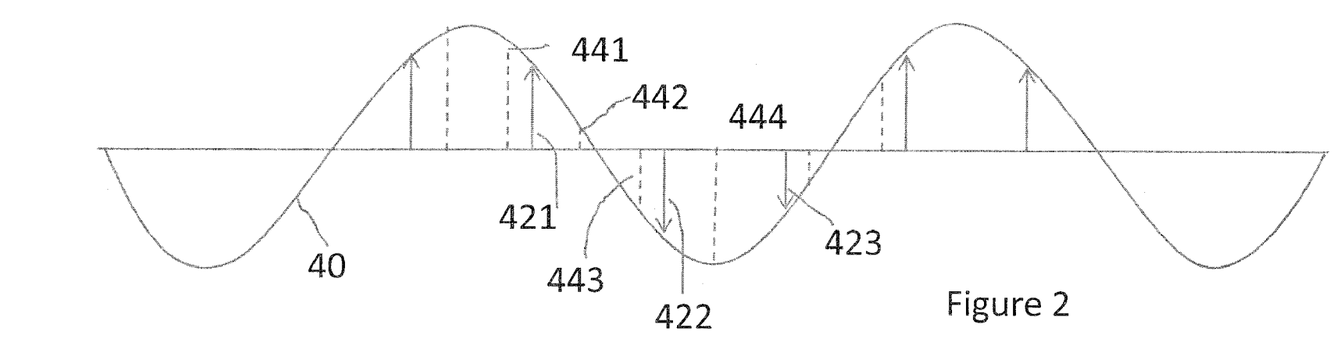
FIG. 2 is a signal diagram showing asynchronous sampling of an analogue waveform.

FIG. 2 shows a simplified illustration of an analogue signal 40 carrying data. The data is represented by solid arrows 421, 422 . . . and is asynchronously sampled to produce asynchronous samples 441, 442 and 443 . . . represented by dash lines which generally do not coincide with the data.

In this example the signal source is a tape drive and the data is recorded on the tape as an analogue signal. The analogue signal reproduced from the tape is sampled by the A/D converter 2 which produces signed eight bit digital representations of the asynchronous analogue signal samples 441, 442, 443 . . . .

Overview of Signal Processing

Referring to FIG. 1A, an FIR filter 4 is connected to the A/D converter 2. The FIR filter 4 equalizes the digital asynchronous signal samples. The FIR filter has filter coefficient adaptation circuitry 41 which is responsive to error signals produced by a slicer#2 14 to adapt the transfer function of the FIR filter to changes in the spectral characteristics of the signal provided by the signal source.

Figure 3:
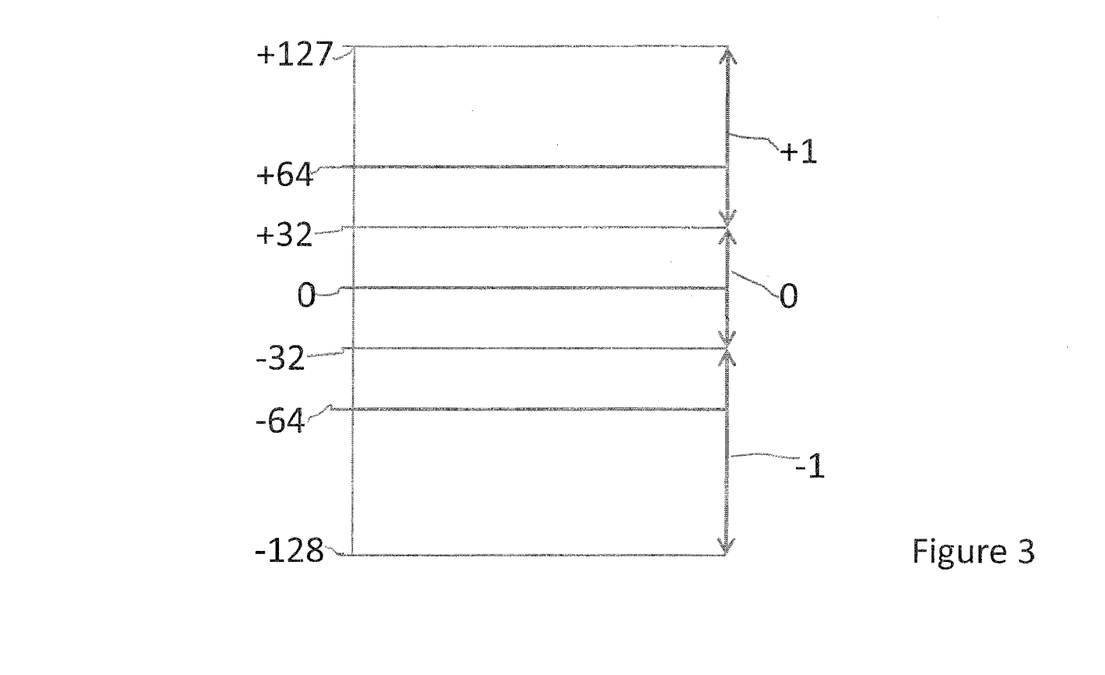
FIG. 3 is a signal diagram showing the relationship of signal levels, ranges and target values.

The slicer#2 receives reconstructed synchronous samples from a sample reconstruction arrangement 8. The reconstructed samples are represented by the eight bit signed numbers which, referring to the example of FIG. 3, represent signal levels denoted as +1, 0 and −1 as follows:

+1 is represented by values X in the range $+32<x<+127$,
0 is represented by values X in the range $-32 \leq x \leq +32$,
−1 is represented by values X in the range $-32>X>-128$.

In this example target values of +64, 0, and −64 are set for the +1, 0, and −1 levels respectively. It will be appreciated that this is one example and other possibilities exist for defining the levels and ranges and setting the target values.

The slicer#2 operates in known manner to produce an error signal indicating the deviation of the signal sample values from the target values. The slicer#2 and the FIR filter together with Interpolated Timing Recovery (ITR) and Automatic Gain Control (AGC) operate to keep the reconstructed signal sample values as close as possible to the target values for robust operation of the recovery apparatus. Performance is improved over stationary FIR. (ITR is the recovery of timing information and the reconstruction of synchronous signal samples using the recovered timing information.)

The FIR filter 4 provides equalised samples to the sample reconstruction arrangement 8 which interpolates the values of the synchronous data samples 421, 422 . . . from the asynchronous samples 441, 442 . . . . The data samples have variable gain applied to them by a automatic gain control loop. The gain controlled reconstructed samples are fed to the output O of the apparatus.

The output O in this example is connected a maximum likelihood detector (MLD) 10 for converting the reconstructed synchronous samples into binary data. In one embodiment, the MLD 10 is implemented as a Viterbi decoder.

This embodiment has three control loops:

i) the Automatic Gain Control (AGC) loop comprising a first slicer 16 (slicer#1) and an AGC controller 20 for controlling the gain applied by a variable gain amplifier 18 to produce gain controlled reconstructed synchronous samples;

ii) a timing recovery control loop comprising the first slicer#1,16, and a timing recovery module 22 for providing timing information to control the interpolation by the reconstruction arrangement of the synchronous samples from the asynchronous samples; and iii) a coefficient adaptation control loop which comprises the second slicer#2, 14, to which is fed reconstructed synchronous signal samples which are not subject to the automatic gain control of the AGC loop except to the extent that the timing recovery is influenced by the AGC loop.

The three loops, including the adaptation control loop and the AGC loop operate simultaneously and continuously.

In this example, the AGC loop has a relatively fast response and the coefficient adaptation control loop has a relatively slow response; in other words the coefficient adaption loop has a longer time constant than the AGC loop. By way of example the coefficient adaptation loop may have a time constant 100 to 1000 times longer than the AGC loop. It will be appreciated that other values of time constant may be used and the values may depend on the characteristics of the signal source.

Referring to FIG. 3, the slicers 14 and 16 provide error signals indicating, for each reconstructed sample, the deviation of the sample value from the target value of the range within which the sample value occurs.

By providing a coefficient adaptation control loop which is substantially insensitive to the action of the AGC loop, the signal to noise ratio of the equalised, reconstructed, samples produced by the FIR filter ITR and AGC is improved through improved matching of equalised signal to the intended partial response target response. Also the complexity of the control system is reduced.

Figure 1B:
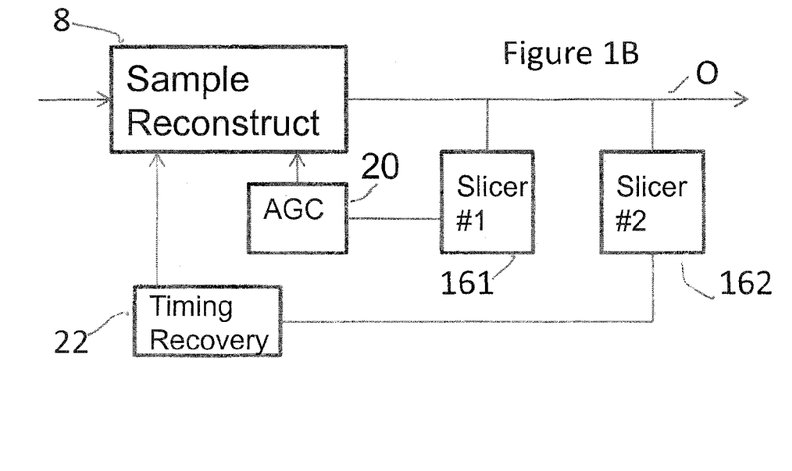
FIG. 1B illustrates a modification of the apparatus of FIG. 1A.

In FIG. 1A, the slicer#1, which has an input IR1 and an output OR1, is common to both the AGC loop and the timing recovery loop. Slicer#2, which has input IR2 and an output OR2, is part of the adaptation control loop. In FIG. 1B, there are respective slicers, slicers#11 and #12 for the AGC loop and the timing recovery loop together with slicer#2 for the adaptation control loop.

Figure 1C:
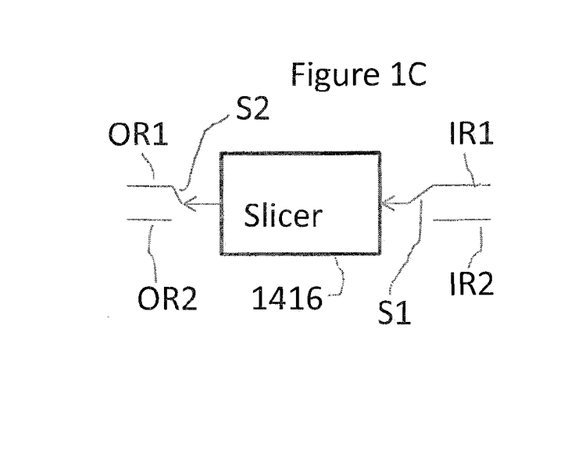
FIG. 1C illustrates another modification of the apparatus of FIG. 1A.

The slicers#1 and #2 perform the same operation. The slicers#1 and #2 may be replaced by a single slicer 1416 as shown in FIG. 1C. The inputs IR1 and IR2 are connected to the slicer via an input switch S1 and the outputs OR1 and OR2 are connected to the slicer via an output switch S2. The switches S1 and S2 are controlled by the system clock 24 to sample the appropriate data samples and produce the appropriate error signals. The switches are switched twice for each synchronous sample to sample both inputs and provide both outputs within one synchronous data clock tick.

Figure 4:
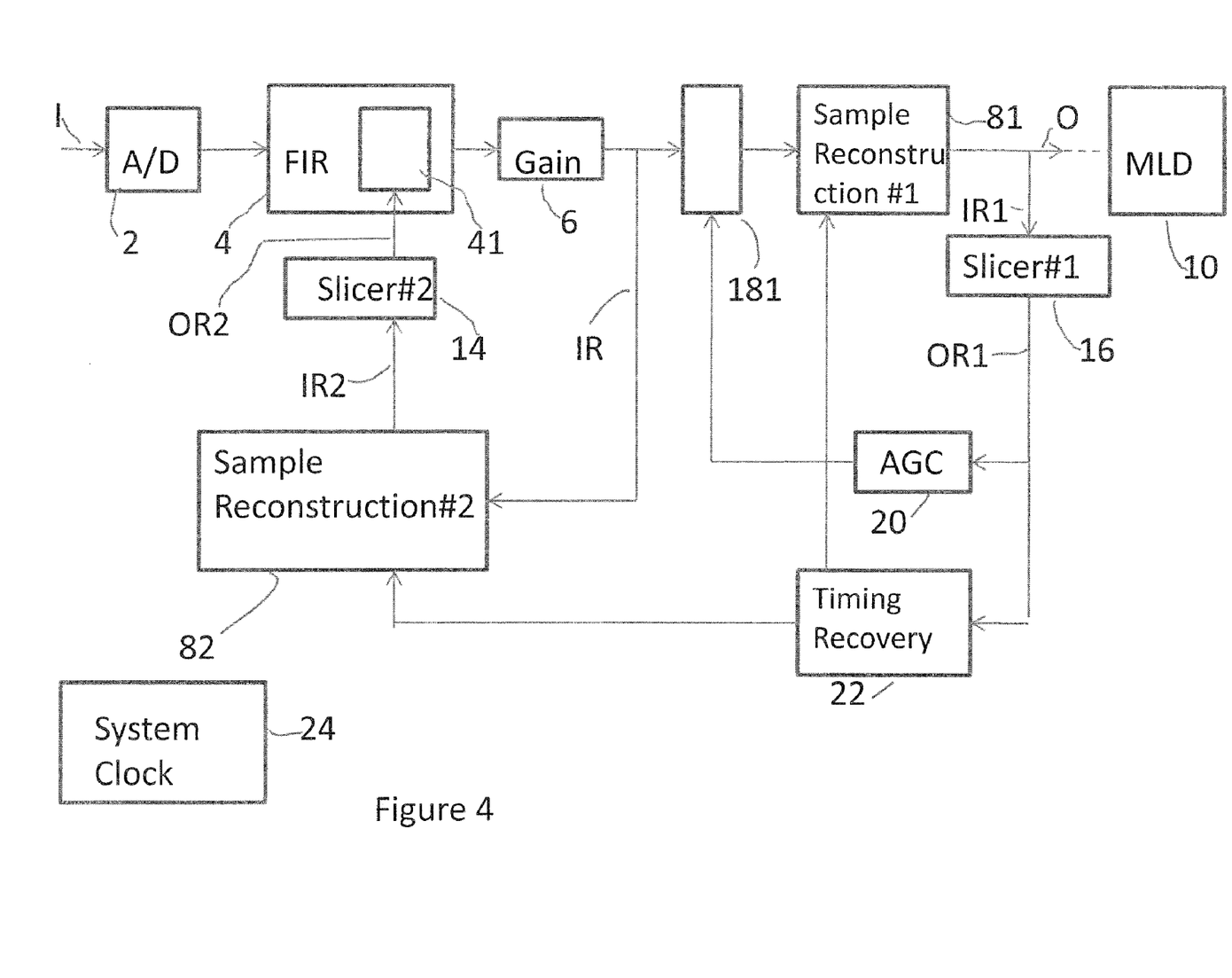
FIG. 4 is a schematic diagram of an example of apparatus for recovering data samples in accordance with the invention.

Embodiment FIG. 4

Referring to FIG. 4, an A/D converter 2 has an input I for receiving an analogue signal as shown in, for example, FIG. 2 and oversamples the analogue signal to produce asynchronous signal samples 441, 442 . . . . The asynchronous samples are provided to an FIR filter 4 which produces equalised asynchronous samples and provides them to a first sample reconstructor#1 81 via a fixed programmable gain module 6 and a variable gain amplifier 181. The fixed gain module 6 may be omitted. The sample reconstructor#1 81 outputs reconstructed synchronous samples which, in this example, are fed via an output O to a maximum likelihood detector 10.

An AGC control loop including an AGC controller 20 and a three level slicer#1 controls the gain applied by the variable gain amplifier 181 to the equalised asynchronous data samples from the FIR filter 4.

A timing recovery control loop including slicer#1 and a timing recovery module 22 provides timing information to the reconstructor#1.

The FIR filter 4 has a coefficient adaptation control loop comprising a sample reconstructor#2 82 and a three level slicer#2, 14.

The sample reconstructor#2 82 receives the equalised asynchronous samples produced by the FIR filter from an input IR upstream of the variable gain module 181; that is, the input IR is upstream of, and unaffected by, the AGC loop. The reconstructor#2 receives timing information from the timing recovery module 22 to reconstruct synchronous samples substantially uninfluenced by the AGC control loop. The three level slicer#2 provides to the FIR filter 4 the error signal indicating, for each sample reconstructed by reconstructor#2, the deviation of its value from the relevant target value.

The AGC loop comprises the three level slicer#1 16 which indicates, for each synchronous sample reconstructed by reconstructor#1, the deviation of its value from the relevant target value. The error signal is provided to the AGC controller 20 which controls the gain of the variable gain amplifier 181 and which applies the controlled gain to the equalised asynchronous samples produced by the FIR filter prior to reconstruction of the synchronous samples by the reconstructor#1.

The timing recovery loop comprises the slicer#1 and the timing recovery module 22 which provides the timing information to both the reconstructor#1 and the reconstructor#2 so that they interpolate the synchronous samples using the same timing information.

In this example, the time constant of the adaptation control loop is longer than that of the AGC loop.

The apparatus of FIG. 4 may be modified as shown in FIG. 1B or 1C.

The embodiment may be implemented as an ASIC.

Figure 5:
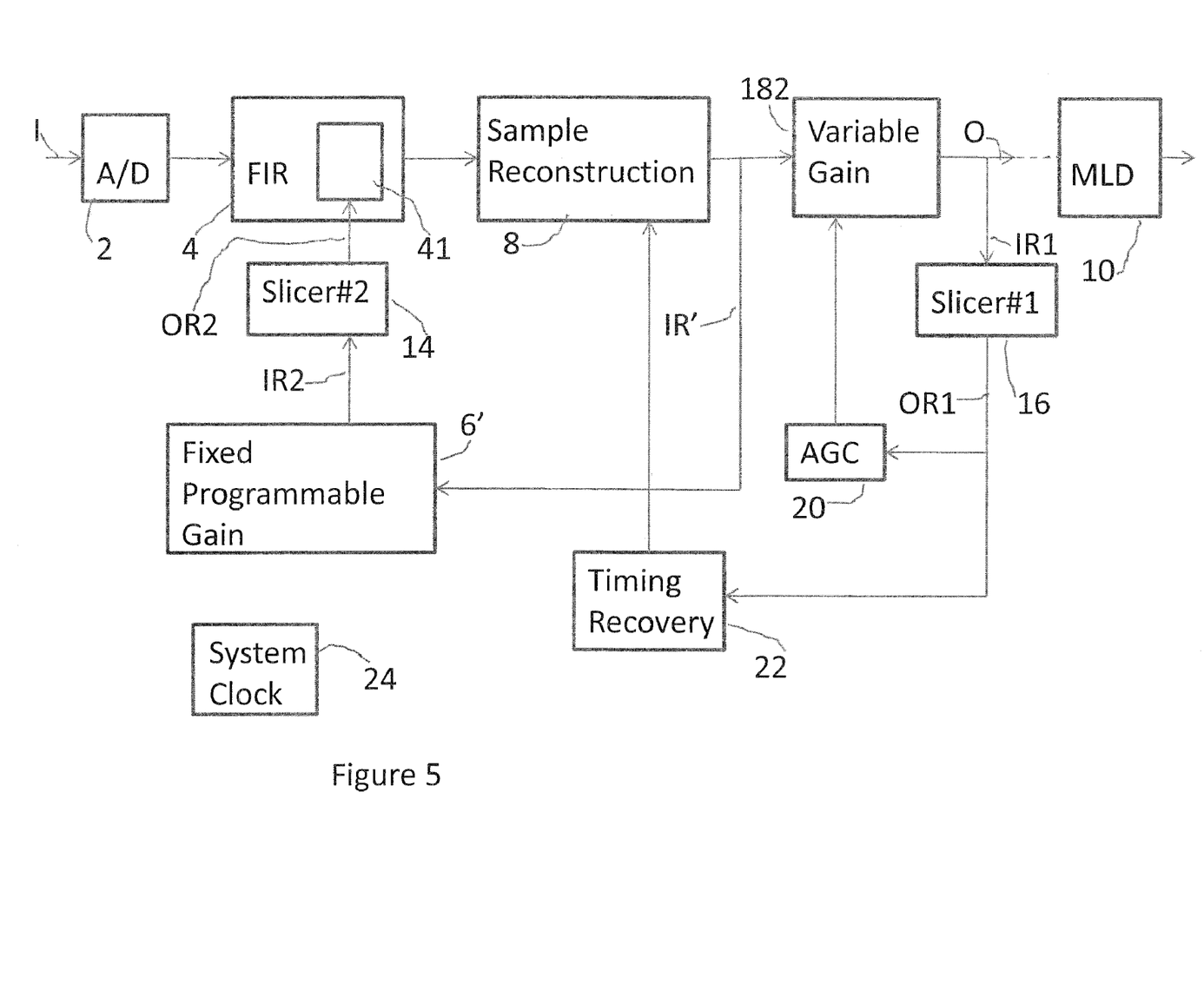
FIG. 5 is a further example of apparatus for recovering data samples in accordance with the invention.

Embodiment FIG. 5

Referring to FIG. 5, an A/D converter 2 has an input for receiving an analogue signal as shown in, for example, FIG. 2 and oversamples the analogue signal to produce asynchronous signal samples 441, 442 . . . . The asynchronous samples are provided to an FIR filter 4 which produces equalised asynchronous samples and provides them to a sample reconstructor 8. The sample reconstructor 8 outputs reconstructed synchronous samples to a variable gain amplifier 182.

The variable gain amplifier 182 has an AGC control loop including a three level slicer#1 16 and an AGC controller 20. The sample reconstructor 8 has a timing recovery control loop including the slicer#1 and a timing recovery module 22. The slicer#1, and thus timing recovery loop, is responsive to the gain controlled reconstructed samples produced by the reconstructor 8 and the variable gain amplifier 182.

The FIR filter 4 has a coefficient adaptation control loop comprising a three level slicer#2 14 and a fixed variable gain module 6'. The fixed variable gain module 6' may be omitted.

The three level slicer#2 14 receives the reconstructed synchronous samples produced by reconstructor 8 from an input IR' upstream of the variable gain amplifier 182 and thus substantially uninfluenced by the gain control loop. The slicer#2 provides to the FIR filter 4 the error signal indicating, for each sample reconstructed by reconstructor 8, the deviation of its value from the relevant target value.

The AGC loop of the variable gain amplifier 182 comprises the three level slicer#1 16 which indicates, for each gain controlled synchronous sample reconstructed by the reconstructor 8 and amplifier 182, the deviation of its value from the relevant target value. The error signal is provided to the AGC controller 20 which controls the gain applied by the variable gain amplifier 182 to the reconstructed synchronous samples.

In this embodiment the output O of the apparatus is coupled to a maximum likelihood detector 10.

The embodiment of FIG. 5 may be modified as shown in FIG. 1B or 1C.

The embodiment may be implemented as an ASIC.

Figure 6:
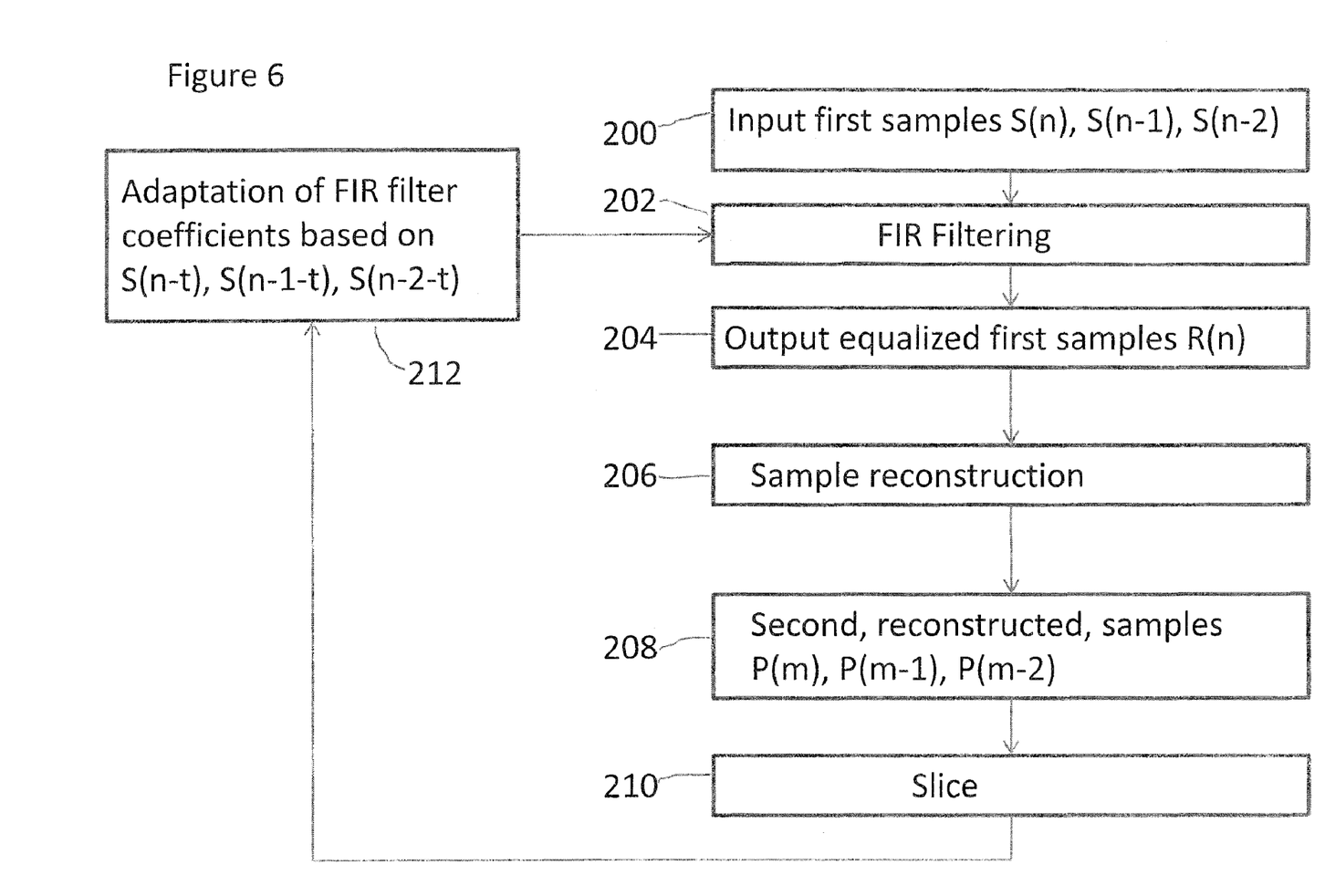
FIG. 6 is a flow diagram illustrating the adaption of filter coefficients of the FIR filter of the apparatus FIG. 4 or FIG. 5.
Figure 7:
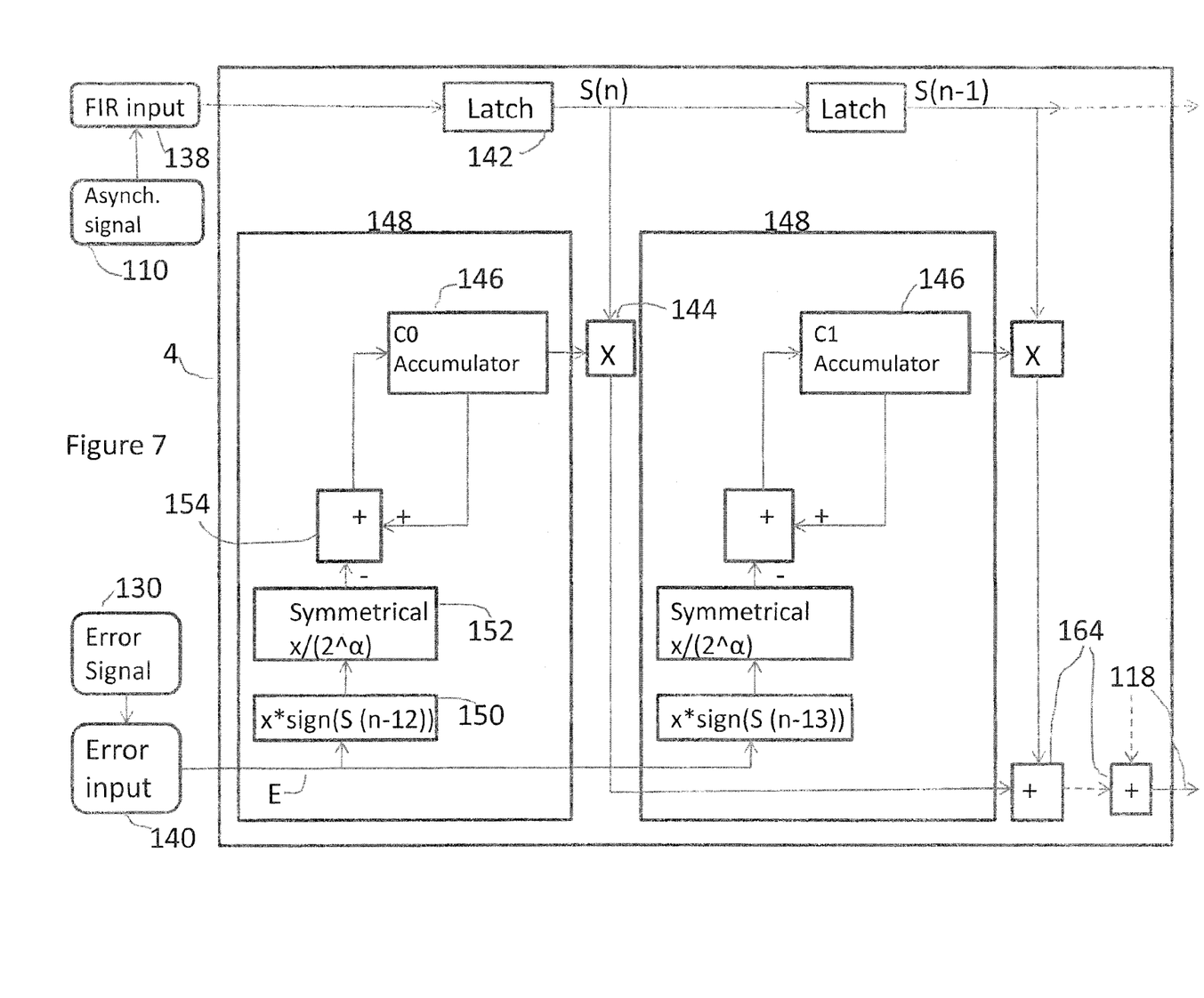
FIG. 7 is a schematic diagram of the FIR filter of the apparatus FIG. 4.

Example of an Fir Filter 4 and Adapting the Filter Coefficients—FIGS. 6 and 7

One embodiment of the method for adaptation of the filter coefficients performed by adaptation circuitry 41 of the FIR filter 4 of FIG. 1, 4 or 5. is explained by way of example in further detail by making reference to FIG. 6.

In step 200, first samples S[n], S[n−1], S[n−2], . . . , i.e. asynchronous samples of the asynchronously over-sampled signal provided by A/D converter 2 (cf. FIG. 1) are inputted into the FIR filter 4. The FIR filter 4 has a set of filter coefficients which are used to perform the FIR filtering in step 202.

After a certain delay, the first equalised sample R[n] is outputted in step 204. The delay corresponds to the number of filter coefficients which are also referred to as filter taps. The equalised first samples are denoted as samples and are used for sample reconstruction in step 206, which provides second samples P[m], P[m−1], P[m−2], . . . in the synchronous domain (step 208). In step 210, the slicing operation is performed by slicer#2 14 which provides an error signal for each one of the second reconstructed samples. The error signal is used in step 212 for adaptation of the FIR filter coefficients. It is to be noted that there is a delay of t between the input of a first sample S[n] in step 200, and the input of the corresponding error signal into the filter adaptation performed in step 212. As a consequence, past filter values S[n−t], S[n−1−t], S[n−2−t], . . . are used to perform the FIR filter coefficient adaptation on the basis of the error signal.

For example, the adaptation of a filter coefficient Ci, where $0 \leq i < k$, of the k FIR filter coefficients is performed as follows:
1. The current value of Ci [n] is given by $$Ci[n] = \text{Round}(Ci_{update}[n]/A),$$

where $Ci_{update}[n]$ is the value currently stored in a high-resolution accumulator of the filter coefficient adaptation circuitry used for updating the filter coefficient Ci, and A is a coefficient that sets the effect of the averaging performed by means of the rounding operation 'Round'.

2. The adapted value for Ci[n+1] is calculated by means of $Ci_{update}[n+1] = Ci_{update}[n] - \{G*S[n-t-i]*E[m]\}$ where G is the adaptation gain, and E [m] is the error signal as generated from the contribution made by S[n−t−i] to the FIR output through the FIR tap under consideration.

The value of t represents the fact that the error E is generated from a synchronous sample which may not be temporally coincident with the corresponding input sample S[n−i]. The value of t is the delay from the input of a first sample S[n] into the FIR filter and the output of the error signal for the resultant synchronous sample P[m] or latency from FIR input to availability of corresponding error signal from the slicer.

This approach for updating the filter coefficients Ci by means of the above equations has the disadvantage that multiplication of S and E is required for each updating of each one of the filter coefficients Ci.

FIG. 7 is a block diagram of an example of the FIR filter 4 operating according to an alternative to this approach, which avoids a need for this multiplication by taking only the sign of the samples S into consideration.

FIR filter 4 has an input 138 for inputting of the samples 110 of the data stream of unequalised asynchronously over-sampled signal delivered by A/D converter 2 (cf. FIG. 1). In addition FIR filter 116 has input 140 for inputting of error signal 130 from the slicer#2 14.

The filter has a series of latches for storing respective serial samples 110 of the data stream. In this example, there is one latch for each filter tap. So, for each filter tap, FIR filter 4 has a latch 142 for storing one of the samples 110, i.e. samples S[n], S[n−1], S[n−2], . . . and a corresponding multiplier 144 for multiplication of the respective data sample by the filter coefficient Ci of the considered tap i stored in an accumulator 146 which is implemented as a register. The results of the multiplications performed by the multipliers 144 are added up by adders 164, which provide the equalised samples 118.

The filter coefficient adaptation is performed by adaptation module 148. In one embodiment considered here each adaptation module 148 has a module 150 for determining the value of the sign function of the respective data sample S[n−t−i] and for multiplication of E [m] by the value of the sign function.

Module 152 of adaptation module 148 serves for scaling of the output value of module 152, for example by dividing the output value by $2^\alpha$ where $\alpha$ is a coefficient that is conveniently chosen, for example between 1 and 4. In one embodiment, module 152 is implemented by means of a shifter.

The output of module 152 is subtracted from the current value $Ci_{update}[n]$ stored in register 146 by means of subtractor 154. The resultant value for $Ci_{update}[n+1]$ is stored in the register 146. In the example considered here, register 146 has a width of 16 bits whereby only the 8 most significant bits are outputted to multiplier 144. This has the effect of low pass filtering the changing value of Ci and thus reduction of the adaptation noise.

The low pass filtering action is also beneficial in maintaining, on average, a temporal correlation between the samples S[n] and error E[m]. The quality of the adaptation convergence relies upon this correlation being, on average, correct and significantly greater than the noise in the system. Since the samples S[n] are asynchronously oversampled relative to the signal E[m], an average correlation relationship is used, where the greater majority of the adaptation corrections calculated for each tap are sufficiently correct to overcome the minority that are not and still drive the convergence of the adaptation correctly.

In the example considered here, the value of t is 12. The filter coefficients Ci can be updated for each new sample 110 that is entered at input 138 or alternatively for each new error signal E that becomes available at error input 140.

The time constant of the adaptation control loop is set by a combination of the value $\alpha$ and the width of the portion of the accumulator 146 used to output data to the multiplier relative to the width of the accumulator.

Figure 8:
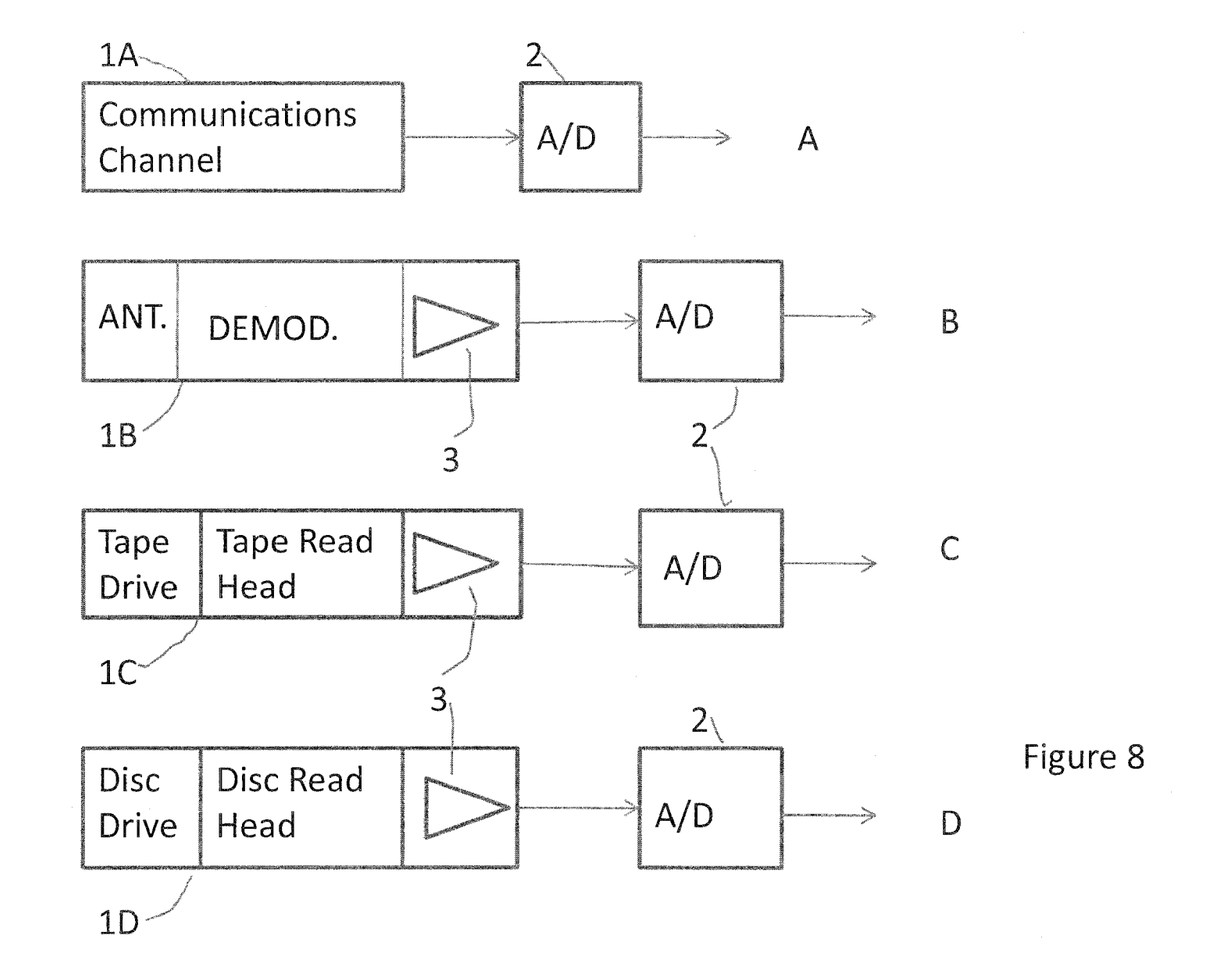

Signal Sources—FIG. 8

The apparatus of FIG. 1, 4 or 5 is for use with a signal source. The signal source may be a communications channel as shown in FIG. 8A. The signal source may be an RF channel including a radio receiver having an antenna, a demodulator and a pre-amplifier 3 as shown in FIG. 8B. The apparatus may be used with other communications channels for example fibre optical channels. The signal source may be that of a tape drive including a tape read head and a pre-amplifier 3 as shown in FIG. 8C. The signal source may be that of a disc drive including a disc read head and a pre-amplifier 3 as shown in FIG. 8D.

FIG. 9

Figure 9:
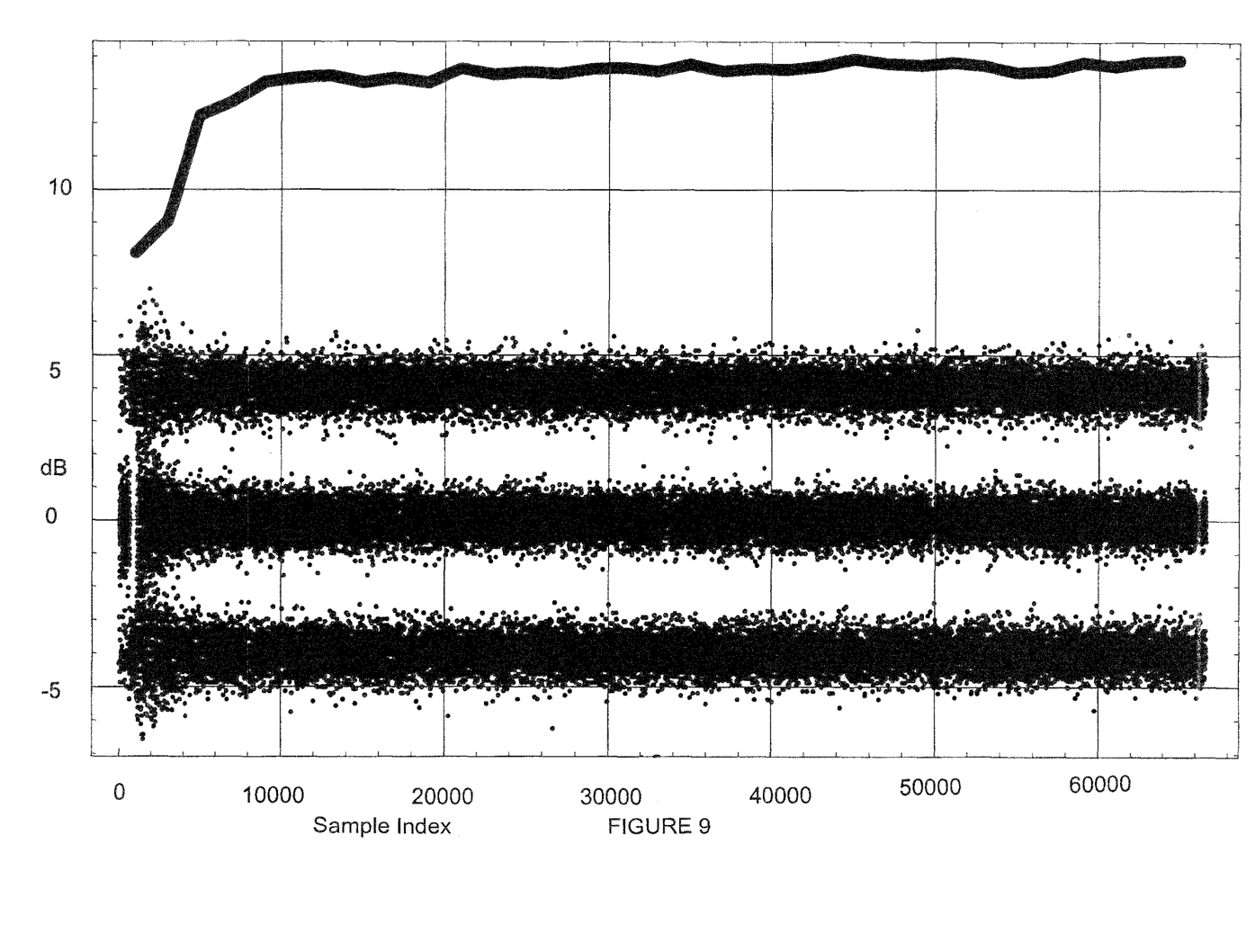
FIG. 9 shows reconstructed synchronous data samples produced by the apparatus of FIG. 4.

FIG. 9 illustrates in the lower section an example of the performance of signal at the output O of the apparatus of FIG. 4 or FIG. 5. FIG. 9 shows, at the bottom, synchronous samples. At the left, between sample index values 0 to 10000, the coefficients of the FIR filter are being initially adapted by the adaptation control loop and it is evident that as the coefficients adapt the samples cluster into three distinct ranges. The graph at the top shows the signal to noise ratio. The signal to noise ratio increases rapidly during adaptation and then gradually increases as adaptation continues.

Very few samples in this example have values outside the three distinct ranges once the initial adaptation is finished.

Figure 10:
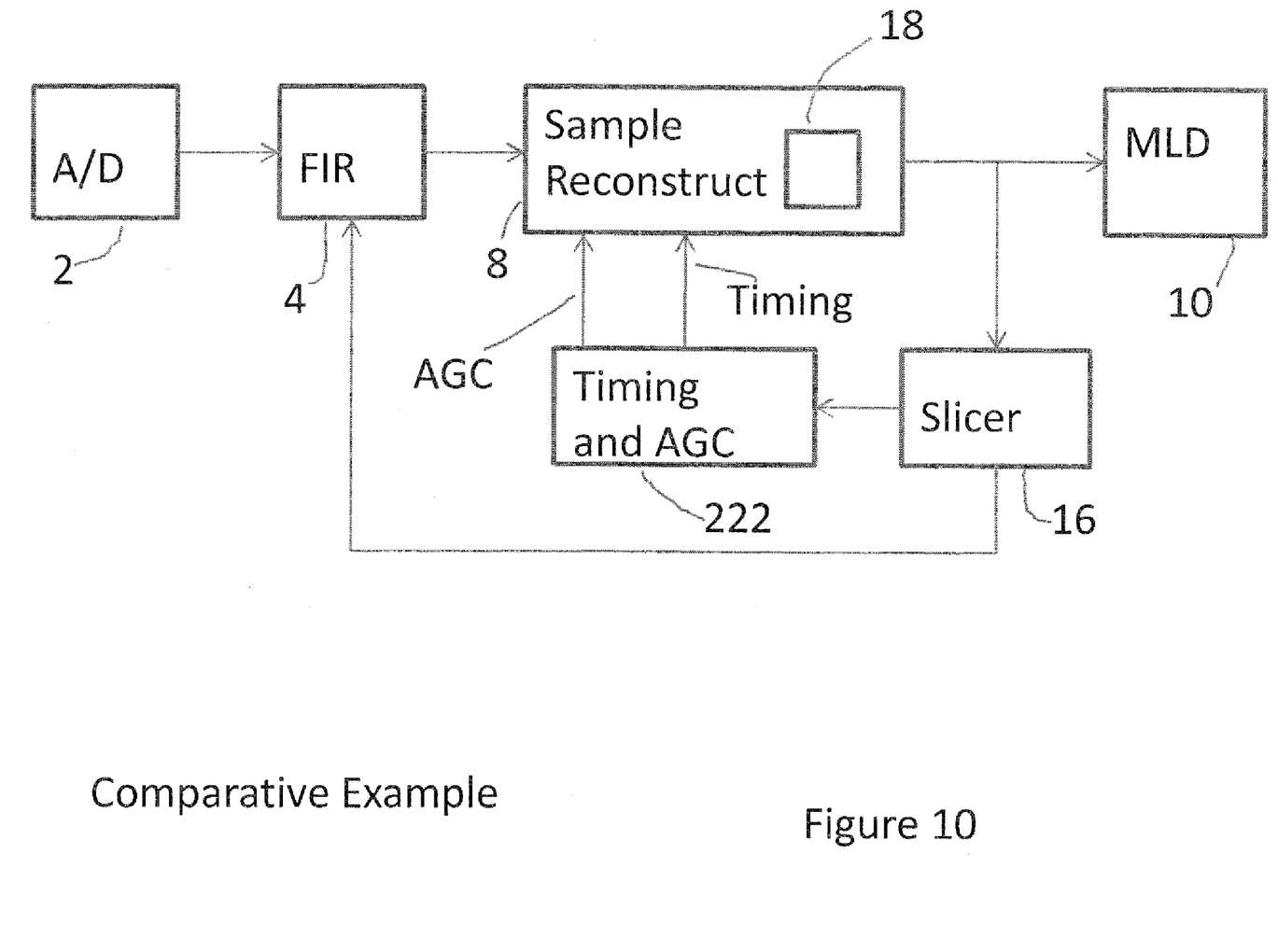
FIG. 10 is a schematic block diagram of a comparative example of apparatus for recovering data samples.
Figure 11:
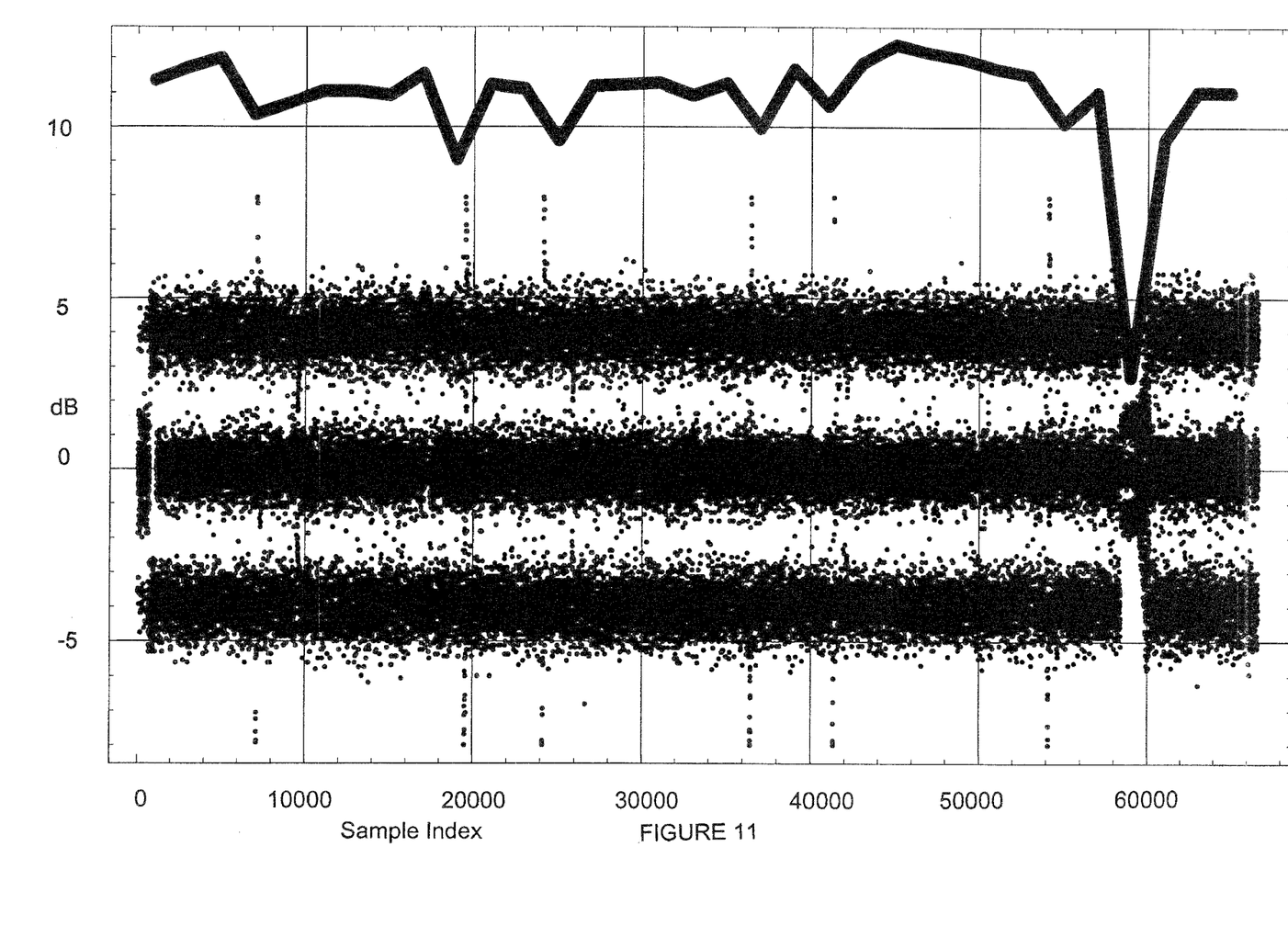
FIG. 11 is a signal diagram of equalised data samples produced by the apparatus of FIG. 10.

Comparative Example—FIGS. 10 and 11

Referring to FIG. 10, a prior proposal comprises an A/D converter 2', an FIR filter 4', a sample reconstructor 8' having an output O via which reconstructed synchronous samples are fed to an MLD 10. The FIR filter 4' has a coefficient adaptation loop responsive to the output of a slicer 16'. The slicer feeds an error signal to the FIR filter 4' and to a timing recovery and gain control module 222 which provides timing information to the reconstructor 8' and automatic gain control to a variable gain element 18 associated with the reconstructor. The output of the slicer, which is also fed to the FIR filter, is sensitive to both timing information and gain control. Thus the adaptation of the filter coefficients both during and after initial adaptation is sensitive to gain control. FIG. 11 shows an example of the performance of the system in such an arrangement. It is evident that the signal to noise ratio is subject to relatively large variations due to sample values being outside the desired ranges. This occurs because the adaptation of the coefficient values is strongly sensitive to the effects of gain control.

It has been proposed to reduce the interaction of coefficient adaptation and gain control by alternately performing adaptation without gain control and gain control without adaptation. That however adds complexity, decreases signal to noise ratio and reduces the performance of the apparatus.

The described embodiments of FIGS. 1, 4 and 5 allow, in a simple implementation, which may be produced at low cost, an AGC loop to operate simultaneously with real time, continuous, adaptation of the FIR coefficients by the coefficient adaptation loop of the FIR filter. The coefficient adaptation takes place upstream of the AGC loop. The adaptation of the FIR filter coefficients is able to proceed continuously whilst at the same time AGC is provided downstream of the FIR filter and its adaptation control loop. AGC provides enhanced reliability of data recovery. The gain control occurs without substantially affecting or interacting with the coefficient adaptation, thus reducing the complexity of the control algorithms. Gain control interacting with the coefficient adaptation produces adverse effects on the reconstruction of the data sample.

The resulting simpler implementation provided by the embodiments also reduces power consumption and less area in an ASIC for implementing the embodiments because simpler control algorithms can be used.

The invention has been described by way of example with reference to data having three levels and thus slicers operating on signal having three levels. However, the invention is not limited to that and may be applied to apparatus operating with more than three levels.

The invention has been described by way of example with reference to FIGS. 1, 4 and 5 in which the blocks or modules may be hard-wired integrated circuits in which parameters such a fixed programmable gain may be stored as programmable data. However the examples may be implemented in a variety of ways including a mixture of hardware and programmable devices. The invention may be implemented in a suitable digital signal processor by software. The invention thus includes a computer program including code which when implemented on a suitable digital signal processor causes the processor to operate as described above with reference to embodiments of the invention.

The computer program may be carried on a carrier, or computer readable medium which may be a signal or a data storage device, for example a hard disk, a CD, electronic memory or any other suitable machine readable medium.

The invention claimed is:

1. Apparatus for recovering synchronous data samples from an asynchronously over-sampled stream of data samples derived from an input signal, where spectral characteristics of the input signal are subject to variation, the apparatus comprising;

an FIR filter having an input for receiving the asynchronously over-sampled stream of data samples and operable to produce equalised asynchronous samples;

a signal sample reconstruction arrangement operable to reconstruct the synchronous data samples from the equalised asynchronous samples;

an automatic gain control loop responsive to a first slicing level error signal to apply gain control for producing gain controlled reconstructed synchronous samples;

a slicer arrangement responsive to the gain controlled reconstructed synchronous samples to produce the first slicing level error signal and responsive to reconstructed synchronous samples substantially unaffected by gain control to produce a second slicing level error signal;

a timing recovery arrangement responsive to the first error signal to provide timing information to the signal sample reconstruction arrangement; and a coefficient adaptation control loop, responsive to the second error signal to adapt the FIR filter coefficients to the variation in the spectral characteristics of the input signal.

2. Apparatus according to claim 1, wherein the coefficient adaptation control loop has a time constant which is longer than that of the automatic gain control loop.

3. Apparatus according to claim 1, wherein:

the slicer arrangement comprises first and second slicers and wherein the first slicer is responsive to the gain controlled reconstructed asynchronous samples for producing the first slicing level error signal; and the second slicer is responsive to the reconstructed synchronous samples substantially unaffected by the automatic gain control loop for producing the second slicing level error signal.

4. Apparatus according to claim 1, wherein the sample reconstruction arrangement comprises:

a first sample reconstructor, responsive to the equalised asynchronous data samples, the timing recovery arrangement, and the automatic gain control, for producing the gain controlled reconstructed synchronous data samples; and a second sample reconstructor, responsive to the equalised asynchronous data samples and the timing recovery arrangement, for producing the equalised reconstructed synchronous data samples substantially unaffected by the automatic gain control.

5. Apparatus according to claim 4, wherein the automatic gain control loop comprises a variable gain amplifier for applying variable gain to the equalised data samples produced by the FIR filter and a gain controller responsive to the first slicing level error signal for controlling the gain applied by the variable gain amplifier, the first sample reconstructor is connected to receive the gain controlled equalised data samples from the variable gain amplifier, and the input of the second reconstructor is connected between the output of the FIR filter and the input of the variable gain amplifier.

6. Apparatus according to claim 3, wherein the signal sample reconstruction arrangement comprises a sample reconstructor, the automatic gain control loop comprises a variable gain amplifier arranged to apply variable gain to the synchronous samples reconstructed by the sample reconstructor and the second slicer is coupled to receive the reconstructed synchronous samples upstream of the variable gain amplifier.

7. Apparatus according to claim 1, wherein the first slicing level error signal represents the deviation of the gain controlled reconstructed synchronous samples from ones of a plurality of slicing levels and the second slicing level error signal represents the deviation of the reconstructed synchronous samples, substantially unaffected by gain control, from ones of a plurality of slicing levels.

8. Apparatus according to claim 1, further comprising a signal source for producing the input signal.

9. Apparatus according to claim 8, wherein the signal source is selected from the group comprising: a communication channel; an RF channel including a radio receiver; a tape drive; and a disk drive.

10. Apparatus according to claim 1 further comprising a maximum likelihood detector arranged to receive the equalised and gain controlled reconstructed asynchronous samples.

11. A method of recovering synchronous data samples from an asynchronously over-sampled stream of data samples derived from an input signal, where spectral characteristics of the input signal are subject to variation, the method comprising;

applying an FIR filter to the asynchronously over-sampled stream of data samples to produce equalised asynchronous data samples;

reconstructing the synchronous data samples from the equalised asynchronous data samples;

applying automatic gain control to the reconstructed synchronous data samples in dependence on a first error signal to produce gain controlled reconstructed synchronous data samples;

slicing the gain controlled reconstructed synchronous data samples to produce the first error signal;

recovering timing information using the first error signal for use in reconstructing the synchronous data samples;

slicing reconstructed synchronous data samples substantially unaffected by the automatic gain control to produce a second error signal; and adapting the FIR filter coefficients to the variation in the spectral characteristics of the input signal in response to the second error signal.

12. A method according to claim 11, wherein adapting the FIR filter coefficient is subject to a time constant which is longer than that of the automatic gain control.

13. A method according to claim 11, wherein:

the slicing comprises slicing reconstructed synchronous data samples upstream of the applying of the automatic gain control.

14. A method according to claim 11, wherein the reconstructing the synchronous data samples comprises:

a first sample reconstruction responsive to the equalised asynchronous data samples, the recovered timing information and the automatic gain control to produce the gain controlled reconstructed synchronous data samples; and a second sample reconstruction responsive to the equalised asynchronous data samples and the recovered timing information to produce the reconstructed synchronous data samples substantially unaffected by the automatic gain control.

15. A non-transitory computer readable medium carrying a computer program which when run on a data processor implements a method of recovering synchronous data samples from an asynchronously over-sampled stream of data samples derived from an input signal, where spectral characteristics of the input signal are subject to variation, the method comprising;

applying an FIR filter to the asynchronously over-sampled stream of data samples to produce equalised asynchronous data samples;

reconstructing the synchronous data samples from the equalised asynchronous data samples;

applying automatic gain control to the reconstructed synchronous data samples in dependence on a first error signal to produce gain controlled reconstructed synchronous data samples;

slicing the gain controlled reconstructed synchronous data samples to produce the first error signal;
recovering timing information using the first error signal for use in reconstructing the synchronous data samples;
slicing reconstructed synchronous data samples substantially unaffected by the automatic gain control to produce a second error signal; and adapting the FIR filter coefficients to the variation in the spectral characteristics of the input signal in response to the second error signal.

* * * * *

UNITED STATES PATENT AND TRADEMARK OFFICE
CERTIFICATE OF CORRECTION

| | | |
|---|---|---|
| PATENT NO. | : 8,149,977 B2 | |
| APPLICATION NO. | : 12/361012 | |
| DATED | : April 3, 2012 | |
| INVENTOR(S) | : Rafel Jibry | |

It is certified that error appears in the above-identified patent and that said Letters Patent is hereby corrected as shown below:

In column 9, line 23, in Claim 3, delete "asynchronous" and insert -- synchronous --, therefor.

In column 10, line 7, in Claim 10, delete "asynchronous" and insert -- synchronous --, therefor.

In column 10, line 40, in Claim 14, delete "wherein the" and insert -- wherein --, therefor.

Signed and Sealed this
Sixth Day of November, 2012

David J. Kappos
*Director of the United States Patent and Trademark Office*